Dec. 12, 1961 G. HANSEN 3,012,354
COMBINED FISHING ROD HOLDERS AND SIGNAL DEVICE MEANS
Filed June 23, 1959 2 Sheets-Sheet 2
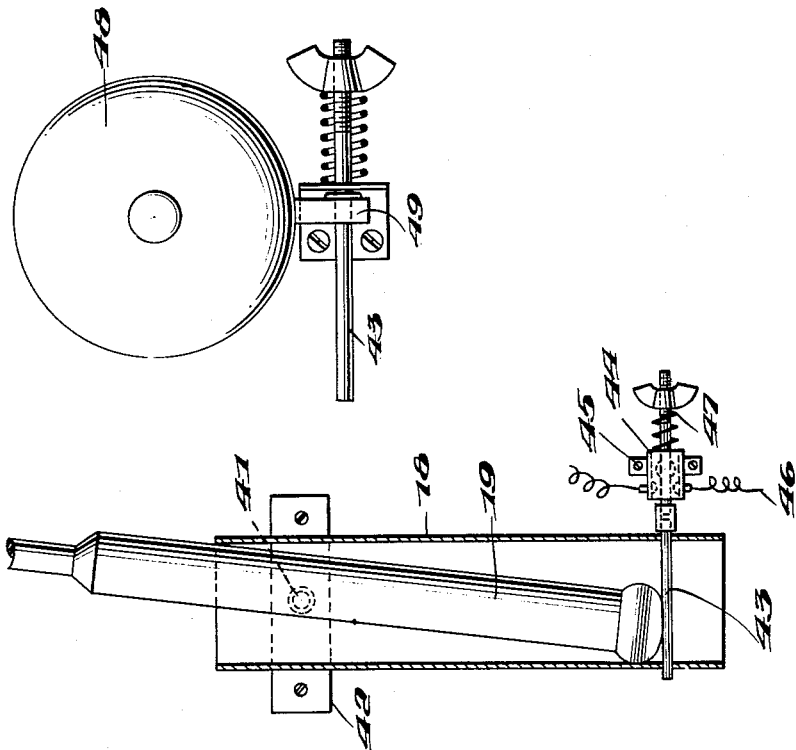
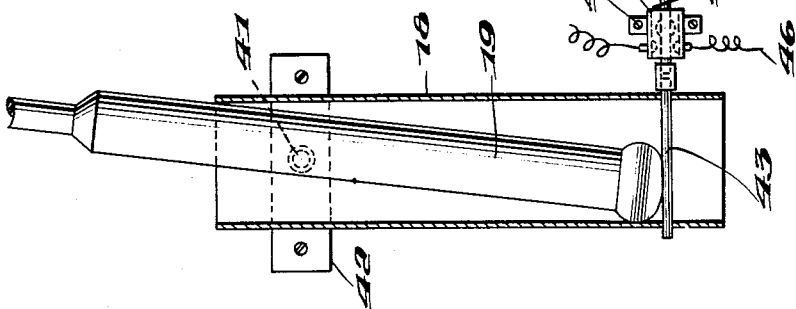
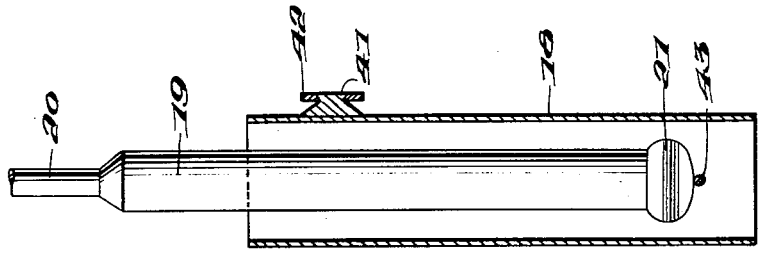
INVENTOR
GOTFRED HANSEN,
BY *Swecker & Mathis*
ATTORNEYS United States Patent Office 3,012,354
Patented Dec. 12, 1961

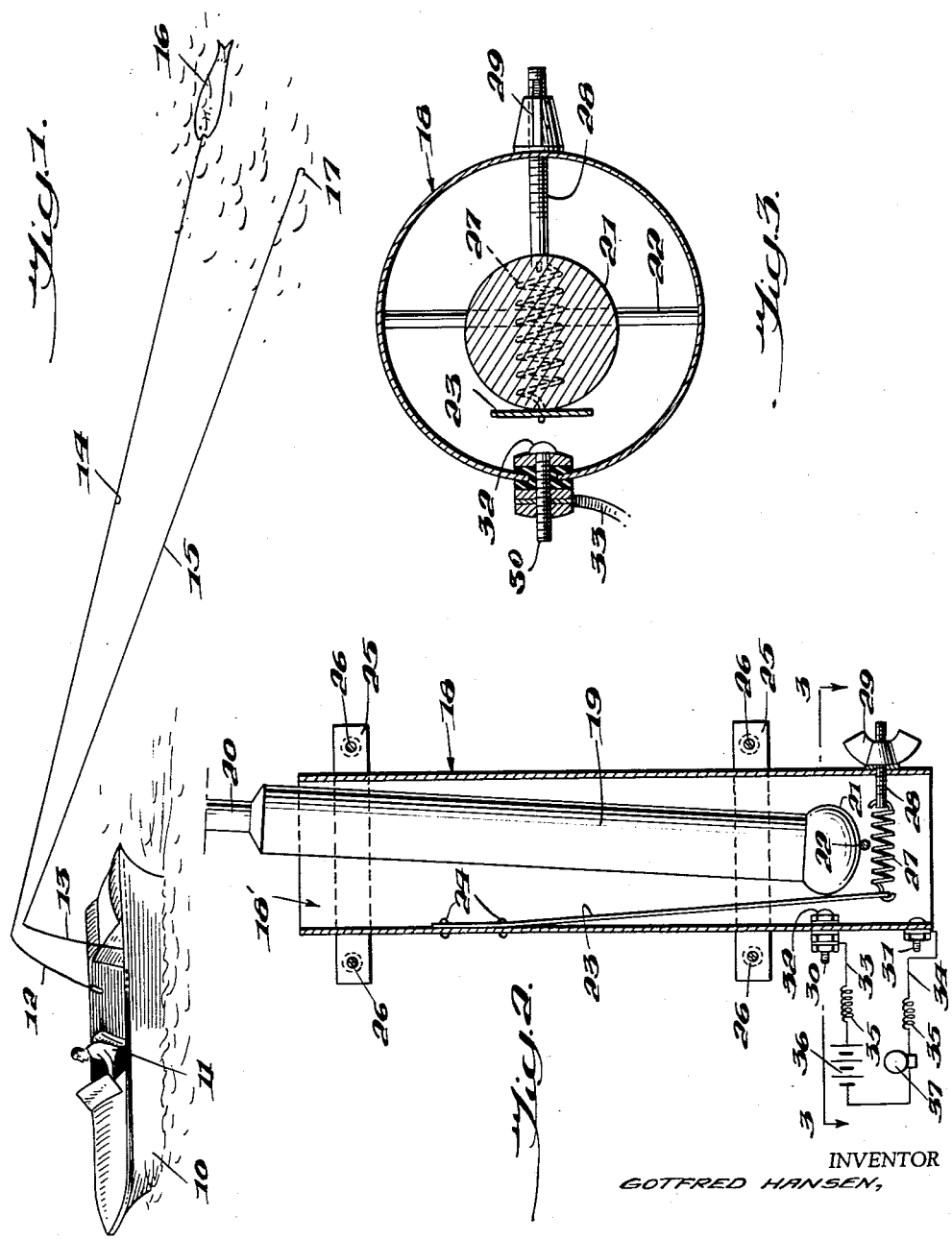

3,012,354
COMBINED FISHING ROD HOLDERS AND
SIGNAL DEVICE MEANS
Gotfred Hansen, 4040 Red Rock Lane, Sarasota, Fla.
Filed June 23, 1959, Ser. No. 822,351
5 Claims. (Cl. 43—17)

This invention relates to combined fishing rod holders and signal device means.

The invention is particularly adapted for use in power boats when used for trolling. However, it may be used for fishing in other ways, as when a pole or rod holder is desired as well as an electrical signal operating means to indicate when there is a bite or strike, said signal being adequate for permitting the fisherman to give his undivided attention to other matters, such as operating the boat used for trolling while waiting for fish to bite or strike.

Various fishing rod or pole holding devices have been suggested for use in boats when trolling for fish; however, such devices are not suitable for power boats because the fishing rods or poles must be watched for bites or strikes, and thus, the fisherman cannot give proper attention to the operation of the power boat.

An object of this invention is to provide a combined fishing rod or pole holder and signal operating means, whereby when used on power boats employed for trolling, the fisherman need only be alert to electrical signals for fish bites or strikes, and otherwise, he can give his entire attention to the operation of the power boat.

It is also an object of the invention that the electrical signal will not be operated by the varying pressures that the drag of the fishline may cause under varying boat trolling speeds, or under various weather conditions.

It is a further object of this invention that the signal operating means may be adjusted for bites or strikes of various types because of the difference in the size of the fish which it is believed may bite or strike, or for other reasons.

Other objects of the invention are that the pole or rod holder can be easily secured to a boat or other support; and that the combined holder and signal operating means is simple in construction, inexpensive to manufacture, and is not subject to becoming inoperative under various conditions of usage.

In the accompanying drawings:

FIG. 1 is a perspective view showing my invention in use on a power boat;

FIG. 2 is a vertical sectional view of the preferred embodiment of my combined fishing rod or pole holder and signal operating means;

FIG. 3 is a detail sectional view looking down on the line 3—3 in FIG. 2;

FIG. 4 is a vertical section through the rod holder showing a modified form of the invention;

FIG. 5 is a similar view at right angles thereto; and

FIG. 6 is a detail plan view showing still a further modification.

In FIG. 1, 10 indicates a power boat, and 11 the fisherman or operator of said boat. For illustrative purposes, two fishing rods 12 and 13 are shown. One of my combined rod holder and signal operating means is employed for each rod. The fishing line 14, from rod 12, shows a fish 15 as taking the bait or lure, as indicated by the bent rod 12. The bait or lure 17 on line 15 is undisturbed, as indicated by the unbent rod 13.

The fishing rod holder is preferably in the form of a metallic hollow post 18, for providing a socket 18' for the handle 19 of a fishing rod 20. The socket 18' is much larger than the handle 19; its size should be sufficient to permit the fishing rod to be slanted in a direction away from the boat, as shown in FIG. 1. The lower end of the handle 19 has the usual rounded head 21 which rests on a transverse pin 22 in the hollow post 18. By slanting the fishing rod, the transverse pin 22 becomes off center respecting the head 21. This makes the head 21 bear against the outer and free end of the leaf spring 23, which is secured by rivets 24 or other suitable fastening means, to the inner wall of the socket 18'.

Metal straps 25 and screws 26, or other suitable means, may be provided for securing the holder 18 to an inner side wall of the boat 10 or other support.

The free end of the leaf spring 23 terminates in an eye for receiving a hook on one end of a coiled or spiral spring 27. The other hook end of the spring 27 is engaged with an eye of a screw bolt 28. The bolt 28 passes loosely through a suitable opening in the wall of the holder 18, at the approximate point shown. A wing nut 29 serves for adjusting the tension of the coiled spring 27.

Near the lower end of the holder 18, binding posts 30 and 31 are provided. One of the posts is electrically insulated from the metallic holder 18, while the other post is not. In the embodiment shown, the post 30 is insulated from the metallic holder, while the post 31 is not. In this form, the head 32 of the post 30 is of such material that it can serve as an electrical make and break contact with the free end of the leaf spring 23. The leaf spring 23 should be of suitable material to serve as a current conductor and for contact making with the binding post head 32.

Electrically insulated wires 33 and 34 extend from the binding posts 30 and 31, respectively. The wires 33 and 34 are connected to a battery 36 and a suitable annunciator, as, for example, a buzzer or bell 37 for placing them in series relation. Thus, when the leaf spring 23 is depressed sufficiently to engage the contact 32, a circuit is established for operating the buzzer 37. Through the loops provided in the wires 33 and 34, as indicated by the loops 35, the buzzer can be located, where desired, by the operator to assure that he will hear all signals for fish bites or strikes on the fishing lines 14 and 15. It should be here noted that, if desired, an electric light or horn can be easily substituted for the buzzer 37.

In the use of my combined rod or holder and signal operating means, the holder 18 is secured to the boat 10, where desired. In FIG. 1, the holders are secured to the inner side walls of the boat. The buzzer 37 is placed near enough to the boat operator to assure that he will hear the signals for fish bites or strikes. The noise level to which the boat operator or fisherman will be subjected during trolling should be controlling in determining the position of the buzzer or other audible signal employed. If an electric light is used as a signal, then, of course, it should be located in front of the boat operator.

After the handle of each fishing rod used is positioned in the socket 18', as illustrated in FIG. 2, then the coiled spring 27 can be adjusted through the wing nut 29. Adjustment of the spring 27 in turn determines to an exactness the amount of pull on the associated fishing line required for causing the handle head 21 to press the free en dof the leaf spring 23 into engagement with the electrical contact head 32 of the insulated post 30 and operate the buzzer 37. The circuit for operating the buzzer would be from the battery 36 through the leaf spring 23, and from thence, through the holder and binding post 31, through the buzzer 37, and back to the battery 36.

The adjustment of the coiled spring 27 must allow for the type or sizes of fish it is believed might bite or strike. Also, adjustment of the coiled spring 27 must allow for the varying pressures the drag of the line may cause in varying boat speeds, or under various weather conditions. Experience in adjusting the spring 27 for different trolling conditions will soon teach the user to know the approximate position of the wing nut 29 for various trolling conditions, including the fish expected to bite or strike.

Referring to FIGS. 4 and 5, the rod holder 18 is constructed substantially as described above for receiving therein the handle 19 of a fishing rod 20. However, the rod holder 18 is pivotally supported at 41 on a mounting bracket 42 adapted to be secured in a suitable position on the boat or other support for the rod. Thus, the holder can swing horizontally about the axis of the pivot 41, which axis extends at right angles to the length of the holder.

Extending transversely through the lower end portion of the holder 18 is a support rod or transverse pin 43 which may be fixed with respect to the cylinder holder or movable lengthwise relative thereto. It is preferred that this be fixed, and that the support pin or rod 43 should extend at right angles to the axis of the pivot 41 in the arrangement illustrated as an embodiment of the invention.

As shown in FIG. 5, a push and pull switch is generally indicated at 44, mounted on a supporting bracket 45 which is carried by the same support on which the bracket 42 is mounted. This switch 44 includes contacts movable to engaged positions by the pin 43, and thereafter to be connected through a conducting line 46 with a suitable annuciator. A spring 47 connected with one end of the rod 43 normally holds the switch 44 in "break" position, thus deenergizing the annunciator until the pin 43 is moved by swinging movement of the holder 18.

A further modification is shown in FIG. 6, in which the pin 43 may be connected with a suitable audible signal such as a bell 48. This may be operated by a lever type member 49 having an operative connection with the slidable pin 43 upon movement of the latter in one direction. This swinging movement of the holder 18 will provide an audible signal, if desired.

The size of the rod holder and the slanting position of the fishing pole in the holder may be varied as desired, as shown in the several embodiments of the invention, to suit the user thereof. Thus, the holder is capable of handling either a light fishing pole or a heavy pole for deep sea fishing, whichever may be desired.

While the invention has been illustrated and described in certain embodiments, it is recognized that variations and changes may be made therein without departing from the invention as set forth in the claims.

I claim:

1. A combined fishing rod holder and signal operating means comprising a socket having inner and outer walls for receiving loosely a handle of a fishing rod and for holding said rod in position for fishing or trolling, means in the socket engaging said handle and facilitating lateral movement of the handle toward the wall of the socket when a pull is made on the fishing line attached to the rod, a leaf spring having one end secured to the inner wall of the socket and having a free end spaced from said wall and in such relation to the rod handle that lateral movement of said handle toward the socket wall will depress the free end of said leaf spring, and cooperative means whereby depression of the free end of the leaf spring a predetermined amount will operate an electrical signal.

2. A combined fishing rod holder and signal operating means comprising a socket having inner and outer walls for receiving loosely a handle of a fishing rod and for holding said rod in position for fishing or trolling, means in the socket engaging said handle and facilitating lateral movement of the handle toward the socket wall when a pull is made on a fishing line attached to the rod, a leaf spring having one end secured to the inner wall of the socket and having a free end spaced from said wall and in such relation to the rod handle that it will be depressed upon movement of said handle toward the socket wall, adjustable means for restraining lateral movement of the rod handle, and cooperative means whereby depression of the free end of the leaf spring a predetermined amount will operate an electrical signal.

3. In combination, a fishing rod having a handle, a fixed holder having inner and outer walls loosely receiving the rod handle and supporting the rod in a fishing or trolling position, a depressible spring carried by the inner wall of the holder normally in engagement with the free end of the rod handle, and cooperative means whereby upon said spring being depressed a predetermined amount an electrical signal is operated.

4. In combination, a fishing rod having a handle, a holder having inner and outer walls for loosely receiving the rod handle and supporting the rod in a fishing or trolling position, a depressible spring carried by the inner wall of the holder normally in engagement with the free end of the rod handle, an insulated electric contact carried by the holder in a position to be engaged by said spring in its depressed position, and operating means for causing an electrical signal when the free end of the handle has moved the spring to its depressed position against the contact.

5. In combination, a fishing rod having a handle, a holder having inner and outer walls loosely receiving the rod handle and supporting the rod in a fishing or trolling position, a leaf spring having one end secured to the inner wall of the holder and the other end extending from said wall and engaging the free end of the rod handle whereby with movement of the free end of the handle toward the holder the free end of the leaf spring will be depressed, a coiled spring with one end anchored to an adjustable screw bolt and its other end attached to the free end of the leaf spring whereby movement of the leaf spring toward the holder wall is adjustably restrained, and cooperative means whereby when said free end of the leaf spring is in a depressed position an electrical signal will be operated.

References Cited in the file of this patent

UNITED STATES PATENTS

| | | |
|---|---|---|
| 2,473,778 | Benes | June 21, 1949 |
| 2,580,956 | Reddick | Jan. 1, 1952 |
| 2,603,900 | Kellett | July 22, 1952 |
| 2,704,411 | Carroll | Mar. 22, 1955 |
| 2,720,048 | Bracey et al. | Oct. 11, 1955 |
| 2,898,697 | Housman | Aug. 11, 1959 |